US012483478B2

(12) United States Patent
Urata et al.

(10) Patent No.: US 12,483,478 B2
(45) Date of Patent: Nov. 25, 2025

(54) CONTROL APPARATUS, CONTROL METHOD AND PROGRAM

(71) Applicant: NTT, Inc., Tokyo (JP)

(72) Inventors: Kengo Urata, Tokyo (JP); Shigeaki Harada, Tokyo (JP); Ryota Nakamura, Tokyo (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/290,951

(22) PCT Filed: Aug. 23, 2021

(86) PCT No.: PCT/JP2021/030865
§ 371 (c)(1),
(2) Date: Jan. 22, 2024

(87) PCT Pub. No.: WO2023/026340
PCT Pub. Date: Mar. 2, 2023

(65) Prior Publication Data
US 2024/0340222 A1  Oct. 10, 2024

(51) Int. Cl.
*H04L 41/0895* (2022.01)
*H04L 41/147* (2022.01)

(52) U.S. Cl.
CPC ........ *H04L 41/0895* (2022.05); *H04L 41/147* (2013.01)

(58) Field of Classification Search
CPC .......................... H04L 41/0895; H04L 41/147
See application file for complete search history.

(56) References Cited

U.S. PATENT DOCUMENTS

2011/0246647 A1 * 10/2011 Marquezan .......... H04L 47/762
709/224

FOREIGN PATENT DOCUMENTS

EP       3121997 A1 *  1/2017  .......... H04L 45/302

OTHER PUBLICATIONS

Kengo Urata et al., "Robust VNF Allocation in Virtual Networks under Uncertainty of Traffic Demands and Renewable Energy Resources", IEICE Technical Report, vol. 120, No. 414, IN2020-57, pp. 19-24, Mar. 2021.

* cited by examiner

*Primary Examiner* — Philip C Lee
(74) *Attorney, Agent, or Firm* — IPUSA, PLLC (57) ABSTRACT

A control apparatus according to an embodiment is a control apparatus that embeds a virtual network for implementing provision of a service on a physical network, the control apparatus including: a first acquisition unit that acquires a predicted value of an amount of traffic of the service and a predicted value of an amount of power including renewable energy usable by each of physical nodes constituting the physical network; a second acquisition unit that acquires information regarding the physical network; a solution calculation unit that calculates an optimal solution of a 2-stage robust optimization problem regarding allocation of virtual nodes constituting the virtual network to the physical nodes and route determination between the virtual nodes to minimize a link congestion rate representing a maximum value of a utilization rate of a link constituting the physical network and a node power congestion rate representing a maximum value of a power consumption rate of a node constituting the physical network on the basis of the predicted value of the amount of traffic, the predicted value of the amount of power, and the information regarding the physical network; and a control unit that controls the virtual network embedded in the physical network on the basis of the allocation of the virtual nodes and the route determination that are represented by the optimal solution.

4 Claims, 5 Drawing Sheets

CONTROL APPARATUS, CONTROL METHOD AND PROGRAM

TECHNICAL FIELD

The present invention relates to a control apparatus, a control method, and a program.

BACKGROUND ART

In recent years, with the development of network function visualization (NFV), which is a virtualization technology, it is possible to provide an enormous variety of network services by flexibly combining a wide variety of virtual network resources (VRs) and virtual network functions (VNFs). To implement provision of such a service, it is necessary to appropriately allocate a VR and a VNF to a physical resource for each service. In addition to that, an End-to-End route also needs to be appropriately determined, to ensure desired communication performance (for example, a communication delay time or the like). In addition, to process enormous services and to be able to cope with a sudden change in an amount of traffic, it is necessary to suppress congestion of each of links constituting a physical network and implement a durable virtual network.

By the way, in recent years, to reduce an environmental load, a movement to introduce renewable energy has been advanced worldwide. This is not an exception in operation of a virtual network environment, and it is expected that a ratio of the renewable energy also increases in an amount of power supplied to a communication network. On the other hand, since an amount of supplied power of the renewable energy depends on a natural environment or the like, it is assumed that an amount of power that can be used by the communication network is acquired as a predicted value including a prediction error. That is, it is assumed that the amount of power of the renewable energy is acquired as information in which uncertainty exists. For this reason, it is necessary to suppress congestion related to an amount of power consumed by each of nodes constituting a physical network and to implement a durable virtual network so that power shortage does not occur even in a case where the amount of power of the renewable energy suddenly changes.

A method has been conventionally proposed for performing VNF allocation and route determination under an NFV environment in consideration of uncertainty related to the amount of power of the renewable energy. For example, Non Patent Literature 1 proposes a method of determining VNF allocation and a service route that minimize some objective function (for example, a total amount of power consumption or the like) related to the entire communication network robustly against both the amount of power of the renewable energy and an amount of traffic related to services on the assumption that there is uncertainty in the amount of traffic related to the services in addition to the amount of power of the renewable energy.

CITATION LIST

Non Patent Literature

Non Patent Literature 1: Kengo Urata, Ryota Nakamura, and Shigeaki Harada, Robust VNF Allocation in Virtual Networks under Uncertainty of Traffic Demands and Renewable Energy Resources, IEICE Technical Report, vol. 120, no. 414, IN2020-57, pp. 19-24, March 2021

SUMMARY OF INVENTION

Technical Problem

However, in Non Patent Literature 1 described above, since durability of the virtual network against sudden changes in the amount of traffic and the amount of power of the renewable energy is not considered, for example, it is considered that problems may occur such as occurrence of deterioration of communication performance or congestion, an increase in cost due to purchase for insufficient power, and an increase in the environmental load due to a decrease in utilization rate of the renewable energy.

Thus, it is considered that it is necessary to define some index related to the durability of the virtual network and then perform VNF allocation and route determination for improving the durability while considering robustness against the uncertainty of both the amount of traffic and the renewable energy.

An embodiment of the present invention has been made in view of the above points, and an object thereof is to implement virtual network control that is robust against uncertainty of an amount of traffic and uncertainty of renewable energy and capable of improving durability.

Solution to Problem

To achieve the above object, a control device (control apparatus) according to an embodiment is a control device that embeds a virtual network for implementing provision of a service on a physical network, the control device including: a first acquisition unit that acquires a predicted value of an amount of traffic of the service and a predicted value of an amount of power including renewable energy usable by each of physical nodes constituting the physical network; a second acquisition unit that acquires information regarding the physical network; a solution calculation unit that calculates an optimal solution of a 2-stage robust optimization problem regarding allocation of virtual nodes constituting the virtual network to the physical nodes and route determination between the virtual nodes to minimize a link congestion rate representing a maximum value of a utilization rate of a link constituting the physical network and a node power congestion rate representing a maximum value of a power consumption rate of a node constituting the physical network on the basis of the predicted value of the amount of traffic, the predicted value of the amount of power, and the information regarding the physical network; and a control unit that controls the virtual network embedded in the physical network on the basis of the allocation of the virtual nodes and the route determination that are represented by the optimal solution.

Advantageous Effects of Invention

It is possible to implement virtual network control that is robust against uncertainty of an amount of traffic and uncertainty of renewable energy and can improve durability.

DESCRIPTION OF EMBODIMENTS

Hereinafter, an embodiment of the present invention will be described. In the present embodiment, a description will be given of a control device 10 (control apparatus) capable of implementing virtual network control (VNF allocation and route determination) that is robust against uncertainty of an amount of traffic and uncertainty of renewable energy and capable of improving durability. Note that, in the following, to distinguish from a virtual network, a network including a physical server requiring power and a physical link is also referred to as a physical network. On the other hand, a network in which a VNF is a virtual node and a route between VNFs is a virtual link is also referred to as a virtual network.

In the present embodiment, two indexes related to the durability of the virtual network are introduced. One is a maximum value of a utilization rate of a link constituting the physical network, and hereinafter, this is referred to as a link congestion rate. Reducing the link congestion rate means increasing an allowable amount for traffic of a service additionally processed. That is, it is meant that if the link congestion rate is small, for example, even if traffic is suddenly generated, deterioration of communication performance or congestion is less likely to occur. The other is a maximum value of a power consumption rate of a node constituting the physical network, and hereinafter, this is referred to as a node power congestion rate. Reducing the node power congestion rate means increasing an allowable amount of power consumption generated when an addable service is processed. That is, it is meant that if the node power congestion rate is small, for example, even if an amount of power of the renewable energy suddenly decreases or a service is suddenly added, power shortage is less likely to occur.

After introducing the above two indexes, the control device 10 according to the present embodiment performs virtual network control that minimizes the node power congestion rate and the link congestion rate robustly against the uncertainty of the amount of traffic and the uncertainty of the renewable energy.

<Theoretical Configuration>

Hereinafter, a theoretical configuration of the present embodiment will be described.

A problem is considered in which a virtual network defined by a combination of a start point (for example, a location of a user, or the like), an end point (for example, a location of a server, or the like), and a VNF (for example, a firewall or the like) used at the time of service provision is considered to be identical to a service provided by the virtual network, and $N_s$ services are embedded in a physical network. That is, a problem is considered of embedding $N_s$ virtual networks that respectively provide $N_s$ services in a physical network. Here, the virtual link can be divided into any number of routes, and can be embedded in one or a plurality of physical links connected to a physical node at any ratio.

A topology of the physical network is denoted by g(N, L), N represents a set of physical nodes, and L represents a set of physical links. In addition, $I_n \subset L$ is a set of physical links flowing into a physical node n∈N, and $O_n \subset L$ is a set of physical links flowing out of the physical node n∈N. In addition, a set of services is S, and a set regarding a type of a VNF is V. Note that g, N, L, S, V, and the like are written in script characters (cursive script), but are written in normal characters in the text of the specification unless there is a misunderstanding. Similarly, $O_n$ and $I_n$ are written in blackboard bold letters (outline characters), but are indicated in normal letters in the text of the specification unless there is a misunderstanding. The same applies to other cursive scripts and outline characters.

At this time, each service is denoted as $g(V_s, E_s)$. Here, $V_s \lfloor V$ is a VNF set of the s-th service, and $E_s$ is a virtual link set of the s-th service. Note that V includes a start point node and an end point node of a service.

In addition, a virtual link e∈$E_s$ of the s-th service is also interchangeably referred to as $(v_{so}, v_d)$. Here, $v_{so}$ represents a start point node of the virtual link e, and $v_d$ represents an end point node of the virtual link e.

Figure 1:
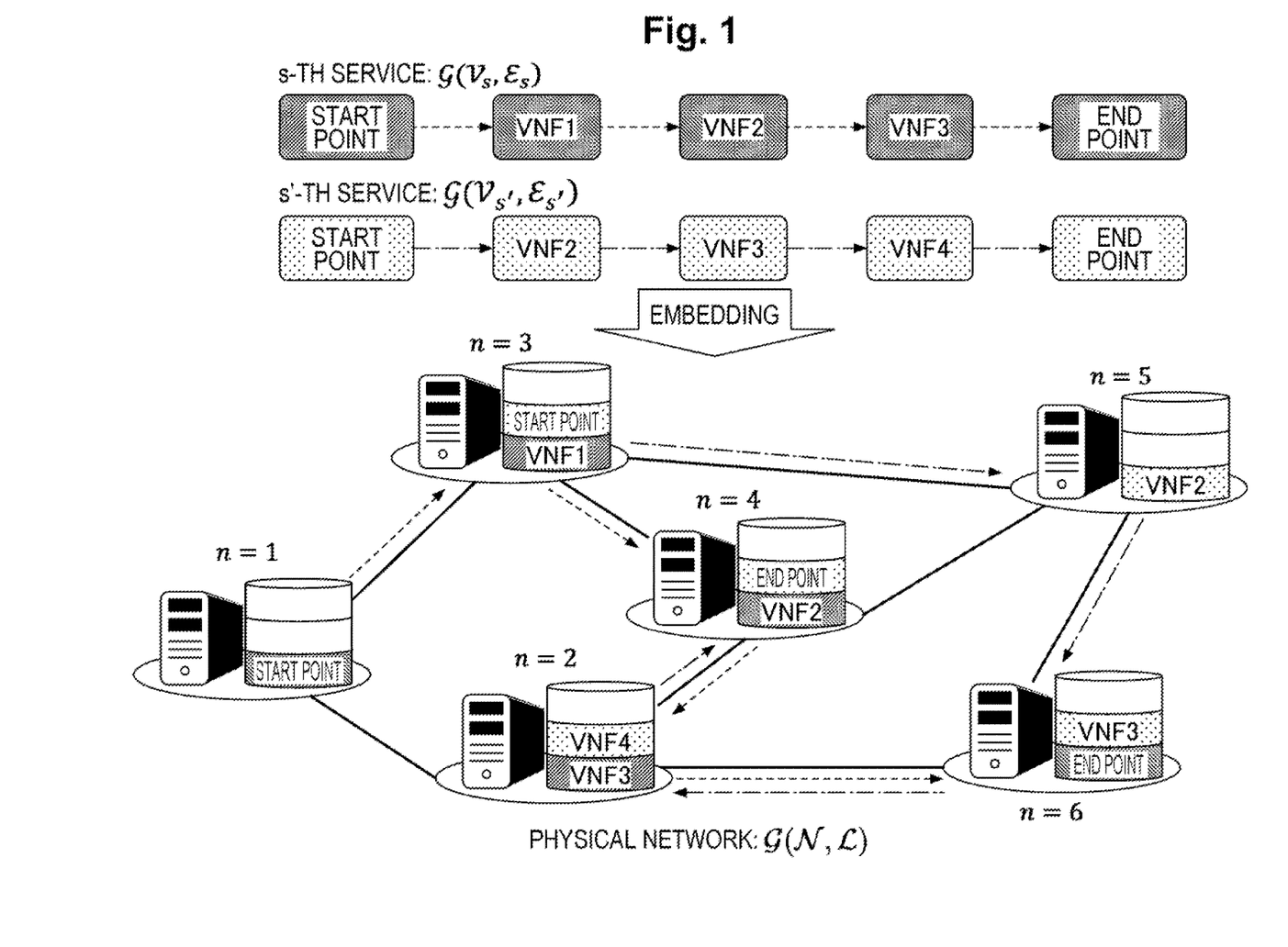
FIG. 1 is a diagram for explaining an example of embedding of a service in a physical network.

FIG. 1 illustrates an example in which a service is embedded in a physical network. The example illustrated in FIG. 1 illustrates a case where the s-th service $g(V_s, E_s)$ including a start point→VNF1→VNF2→VNF3→an end point and an s'-th service $g(Ve_{s'}, E_{s'})$ including a start point VNF2→VNF3→VNF4→an end point are embedded in the physical network g(N, L). Specifically, the s-th service $g(V_s, E_s)$ is embedded in a physical node 1→a physical node 3→a physical node 4→a physical node 2→a physical node 6. Similarly, the s'-th service $g(V_{s'}, E_{s'})$ is embedded in the physical node 3→a physical node 5→the physical node 6→the physical node 2→the physical node 4.

An amount of traffic generated in the s-th service (hereinafter, it is also referred to as a "service s".) is $\lambda_s$. Examples of the amount of traffic $\lambda_s$ include a data transfer rate bps. In a case where future VNF allocation and route determination are performed, it is assumed that the amount of traffic $\lambda_s$ is obtained as a predicted value by some prediction method. That is, it is necessary to consider the problem of embedding the virtual network on the basis of uncertainty of the predicted value of the amount of traffic $\lambda_s$. Note that various methods can be considered as a prediction method of the amount of traffic $\lambda_s$, and examples of the prediction method include a method of constructing a time series model such as an autoregressive model that predicts a future amount of traffic from time series data of a past amount of traffic and obtaining a predicted value of the future amount of traffic from the time series model. In addition, for example, a method can also be considered of using an average and a variance of the amount of traffic in past several days as the predicted value.

In addition, as a power source to be supplied to each physical node, renewable energy and contract power are assumed. Since an amount of supplied power of the renewable energy depends on a natural environment or the like, there is uncertainty in the predicted value. For this reason, there is also uncertainty in a maximum amount of power $\mu_n$ (hereinafter, it is referred to as maximum available amount of power.) predicted to be available to each physical node n. That is, it is necessary to consider the problem of embedding the virtual network in consideration of the uncertainty of the maximum available amount of power $\mu_n$.

Thus, in the following, formulation is performed of the problem of embedding the virtual network that is robust against the uncertainty of the amount of traffic and the uncertainty of the renewable energy. As preparation, first, the uncertainty of the amount of traffic and the uncertainty of the maximum available amount of power of each physical node are described as the following polyhedron set.

[Math. 1]

$$\Lambda_s := \left\{ \lambda_s := \bar{\lambda}_s + \zeta_s \Delta \lambda_s : -1 \le \zeta_s \le 1, \sum_{s \in S} |\zeta_s| \le \gamma_\lambda \right\} \quad (1)$$

$$\mathcal{M}_n := \left\{ \mu_n := \bar{\mu}_n + \zeta_n \Delta \mu_n : -1 \le \zeta_n \le 1, \sum_{n \in \mathcal{N}} |\zeta_n| \le \gamma_\mu \right\} \quad (2)$$

Here,

[Math. 2]

$$\bar{\lambda}_s \in \mathbb{R}_+$$

the above expression represents a nominal value of the amount of traffic generated in the service s, and

[Math. 3]

$$\bar{\mu}_s \in \mathbb{R}_+$$

the above expression represents a nominal value of the maximum available amount of power of the physical node n. Here, the nominal value refers to a reference value, and for example, it is sufficient that a statistical index is used such as an average value or a median value. In addition, $\Delta \lambda_s \in \mathbb{R}_+$ is a deviation of the amount of traffic generated in the service s from the nominal value, and $\Delta \mu_n \in \mathbb{R}_+$ is a deviation of the maximum available amount of power of the physical node n from the nominal value, and are parameters describing uncertainty.

In the above uncertainty set (1), the parameter $\gamma_\lambda$ is a parameter for adjusting a degree of deviation from the nominal value. Similarly, in the above uncertainty set (2), the parameter $\gamma_\mu$ is a parameter for adjusting a degree of deviation from the nominal value. These parameters $\gamma_\lambda$ and $\gamma_\mu$ can also be said to be parameters that define the magnitude of the uncertainty set.

Under the above preparation, formulation, as the following 2-stage robust optimization problem, is performed of a problem of embedding a virtual network that minimizes a total cost of the entire virtual network with respect to the uncertainty of the amount of traffic and the uncertainty of the maximum available amount of power of the physical node respectively described in the uncertainty sets (1) and (2).

[Math. 4]

$$\min_{x_n^{v,s}} \max_{\mu_n \in \mathcal{M}_n} f_1(x_n^{v,s}) + \max_{\lambda_s \in \Lambda_s} \min_{y_\ell^{e,s} \in \mathcal{Y}(\lambda_s, x_n^{v,s})} f_2(y_\ell^{e,s}) \quad (3a)$$

$$\text{s.t.} \sum_{s \in S} \sum_{v \in \mathcal{V}_s} d_n^{v,s} x_n^{v,s} \le \mu_n, \forall n \in \mathcal{N} \quad (3b)$$

$$\sum_{n \in \mathcal{N}} x_n^{v,s} = 1, \forall v \in \mathcal{V}_s, \forall s \in \mathcal{S} \quad (3c)$$

$$\sum_{v \in \mathcal{V}_s} x_n^{v,s} \le 1, \forall n \in \mathcal{N}, \forall s \in \mathcal{S} \quad (3d)$$

$$x_n^{v,s} \in \{0, 1\}, \forall n \in \mathcal{N}, \forall v \in \mathcal{V}_s, \forall s \in \mathcal{S} \quad (3e)$$

Here, $x_n^{v, s}$ is a binary variable, and takes 1 in a case where a VNF $v \in V_s$ of the service s is allocated to the physical node $n \in N$, and 0 otherwise. In addition, $y_l^{e, s}$, $\in R$ (l is a lower case L) is a continuous variable that takes greater than or equal to 0 and less than or equal to 1, and represents a ratio of embedding the virtual link $e \in E_s$ of the service s in a physical link $l \in L$. In an objective function (3a), $f_1(x_n^{v, s})$ and $f_2(y_l^{e, s})$ are respectively functions defined below.

[Math. 5]

$$f_1(x_n^{v,s}) := \max_{n \in \mathcal{N}} \frac{1}{\mu_n} \sum_{s \in S} \sum_{v \in \mathcal{V}_s} d_n^{v,s} x_n^{v,s} \quad (4a)$$

$$f_2(y_\ell^{e,s}) := \max_{\ell \in \mathcal{L}} \frac{1}{\phi_\ell} \sum_{s \in S} \sum_{e \in \mathcal{E}_s} \lambda_s y_\ell^{e,s} \quad (4b)$$

The above $f_1(x_n^{v, s})$ represents a node power congestion rate, and $f_2(y_l^{e, s})$ represents a link congestion rate.

An inequality (3b) represents a constraint on the maximum available amount of power of the physical node, and $d_n^{v, s}$ is a power consumption coefficient in a case where the VNF $v \in V_s$ is allocated to the physical node n. An equation (3c) represents that each VNF of each service can be allocated to only one physical node. On the other hand, an inequality (3d) means that a plurality of VNFs cannot be allocated to one physical node in one service. This constraint condition of (3d) is seemingly strict, and seems to narrow a practical application range; however, for example, by newly treating a combination of two or more VNFs to be allocated to a certain physical node as one VNF, two or more VNFs can be allocated to one physical node.

In addition, a set $y(\lambda_s, x_n^{v, s})$ of $y_l^{e, s}$ that can be taken when the amount of traffic $\lambda_s$ and $x_n^{v, s}$ are fixed is described as the following formula.

[Math. 6]

$$\mathcal{Y}(\lambda_s, x_n^{v,s}) := \{y_\ell^{e,s} : 0 \le y_\ell^{e,s} \le 1, \quad (5a)$$

$$\forall n \in N, \forall e \in \mathcal{E}_s, \forall s \in S, (5b), (5c) \text{ and } (5d) \text{ hold}\}$$

$$\sum_{s \in S} \sum_{e \in \mathcal{E}_s} \lambda_s y_\ell^{e,s} \le \phi_\ell, \forall \ell \in \mathcal{L} \quad (5b)$$

$$\sum_{\ell \in \mathcal{L}} \sum_{e \in \mathcal{E}_s} p_\ell^{e,s} y_\ell^{e,s} \le T, \forall s \in \mathcal{S} \quad (5c)$$

$$\sum_{\ell \in O_n} y_\ell^{e,s} - \sum_{\ell \in I_n} y_\ell^{e,s} = x_n^{v_{so},s} - x_n^{v_{d},s}, \forall n \in N, \forall e \in \mathcal{E}_s, \forall s \in S \quad (5d)$$

Here, an inequality (5b) is a capacity constraint on a physical link, and $\phi_l$ (l is a lower case L) represents a maximum capacity of the physical link $l \in L$. In addition, an inequality (5c) is a constraint on a delay time required to process each service s, $p_l^{e, s}$ represents a delay time coefficient, and T represents a delay time upper limit value.

In the 2-stage robust optimization problem formulated in (3a) to (3e) and (5a) to (5d), solutions are calculated in two stages. First, in the first stage, under the unknown amount of traffic $\lambda_s$, the VNF allocation $x_n^{v, s}$ is determined that minimizes the node power congestion rate $f_1(x_n^{v, s})$ with respect to a scenario of a case where the maximum available amount of power $\mu_n$ is the worst. In the second stage, under the known amount of traffic $\lambda_s$, an embedding ratio (that is, a route) $y_l^{e, s}$ of the virtual link is determined that minimizes the link congestion rate $f_2(y_l^{e, s})$. As a result, it is possible to obtain a control solution (that is, the VNF allocation $x_n^{v,s}$ and the route determination $y_l^{e,s}$) having durability against a sudden change of the amount of traffic and the amount of power of the renewable energy robustly against the uncertainty of the amount of traffic and the uncertainty of the renewable energy. Hereinafter, a specific solving procedure will be described.

A solving algorithm for the 2-stage robust optimization problem formulated in (3a) to (3e) and (5a) to (5d) is constructed on the basis of a Column-and-constraint generation (C & CG) method. This C & CG method is an algorithm that decomposes an original problem into a master problem and a sub-problem and alternately solves them to obtain a solution of the original problem. Hereinafter, (3a) to (3e) are also collectively referred to as (3). Similarly, (5a) to (5d) are also collectively referred to as (5). For other formula numbers, a similar method is used in a case where a plurality of formula numbers is collectively referred to.

The master problem in step K is defined as follows.

[Math. 7]

$$\min_{x_n^{v,s}, r_1 > 0} r_1 \quad (6a)$$

$$\text{s.t. } r_1 \geq \frac{1}{\overline{\mu}_n - \Delta\mu_n} \sum_{s \in S}\sum_{v \in \mathcal{V}_s} d_n^{v,s} x_n^{v,s} + \frac{1}{\phi_\ell} \sum_{s \in S}\sum_{e \in \mathcal{E}_s} \lambda_s(k) y_\ell^{e,s}(k), \quad (6b)$$

$$\forall n \in \mathcal{N}, \forall \in \mathcal{K}$$

$$\sum_{s \in S}\sum_{e \in \mathcal{E}_s} \lambda_s(k) y_\ell^{e,s}(k) \leq \phi_\ell, \forall \ell \in \mathcal{L}, \forall k \in \mathcal{K} \quad (6c)$$

$$\sum_{s \in \mathcal{L}}\sum_{e \in \mathcal{E}_s} p_\ell^{e,s} y_\ell^{e,s}(k) \leq T, \forall s \in \mathcal{S}, \forall k \in \mathcal{K} \quad (6d)$$

$$\sum_{\ell \in O_n} y_\ell^{e,s}(k) - \sum_{\ell \in I_n} y_\ell^{e,s}(k) = x_n^{v_s,o,s} - x_n^{v_d,s}, \quad (6e)$$

$$\forall n \in \mathcal{N}, \forall e \in \mathcal{E}_s, \forall s \in \mathcal{S}, \forall k \in \mathcal{K}$$

$$(3b), (3c), (3d), \text{ and } (3e) \text{ hold}$$

Here, in the above problem, $\lambda_s(k)$ is a solution of the sub-problem (described later) obtained up to step K-1. In addition, a cursive script K is expressed as below.

[Math. 8]

$$\mathcal{K} := \{1, 2, \ldots K-1\}$$

In the following, optimal solutions of the master problem are $x_n^{*v,s}(K)$, $r_1^*(K)$, and a lower bound to an optimal solution of the original problems (3) and (5) is $\psi_{LB}(K)$. At this time, the following formula holds.

[Math. 9]

$$\psi_{LB}(K) = r_1^*(K)$$

The optimal solution $x_n^{*v,s}(K)$ obtained in the master problem is used in the sub-problem in step K. In addition, note that $y_l^{e,s}(k)$ is also solved as a determination variable in the master problem.

Next, the sub-problem in step K is defined as follows.

[Math. 10]

$$\max_{\lambda_s \in \Lambda_s, y_\ell^{e,s} \in \mathcal{Y}(\lambda_s, x_n^{*v,s}(K))} \min f_2(y_\ell^{e,s}) \quad (7)$$

In the above problem, it is assumed that there is an optimal value $(\lambda_s^*(K), y_l^{*e,s}(K))$ such that the objective function has a finite value. That is, it is assumed that the sub-problem (7) is executable for any solution of the master problem. Note that, in a case where the sub-problem (7) is not executable for a certain solution of the master problem, for example, the control device 10 may output information indicating that embedding of the virtual network is not possible.

Since the above sub-problem (7) is a bi-level optimization problem and the objective function is not linear, it is difficult to solve the problem in the current form. Thus, to avoid this, first, $f_2(y_l^{e,s})$ that is a maximum value acquisition function is converted into a linear constraint to obtain the following formula.

[Math. 11]

$$\max_{\lambda_s \in \Lambda_s, y_\ell^{e,s} \in \mathcal{Y}(\lambda_s, x_n^{*v,s}(K)), r_2 > 0} \min r_2 \text{ s.t. } r_2 \geq \frac{1}{\phi_\ell} \sum_{s \in S}\sum_{e \in \mathcal{E}_s} \lambda_s y_\ell^{e,s}, \forall \ell \in \mathcal{L} \quad (8)$$

Further, the inner minimization problem in the sub-problem (7) is transformed into a dual problem, and caused to come down to the following single level maximization problem.

[Math. 12]

$$\max_{\lambda_s \in \Lambda_s, \pi_{1,\ell}\pi_{2,\ell}, \pi_{3,\ell}, \xi_n^{e,s}, \theta_\ell^{e,s} \in \mathbb{R}} f_{sub}(\pi_{1,\ell}\pi_{2,\ell}, \pi_{3,\ell}, \xi_n^{e,s}, \theta_\ell^{e,s}) \quad (9a)$$

$$\text{s.t. } \sum_{\ell \in \mathcal{L}} \pi_{1,\ell} \leq 1, \quad (9b)$$

$$g_{sub}(\lambda_s, \pi_{1,\ell}\pi_{2,\ell}, \pi_{3,\ell}, \xi_n^{e,s}, \theta_\ell^{e,s}) \geq 0, \forall n \in N, \forall e \in \mathcal{E}_s, \forall s \in S, \quad (9c)$$

$$\pi_{1,\ell}, \pi_{2,\ell} \geq 0, \forall l \in L, \pi_{3,s} \geq 0, \forall s \in S,$$

$$\theta_\ell^{e,s} \geq 0, \forall n \in N, \forall e \in \mathcal{E}_s, \forall s \in S$$

Here, the following formula holds.

[Math. 13]

$$f_{sub}(\pi_{1,\ell}\pi_{2,\ell}, \pi_{3,\ell}, \xi_n^{e,s}, \theta_\ell^{e,s}) :=$$

$$-\sum_{\ell \in \mathcal{L}}\pi_{2,\ell}\phi_\ell - T\sum_{s \in S}\pi_{3,s} + \sum_{s \in S}\sum_{e \in \mathcal{E}_s}\sum_{n \in \mathcal{N}} \xi_n^{e,s}\left(x_n^{v_s,o,s} - x_n^{v_d,s}\right) - \sum_{s \in S}\sum_{\ell \in \mathcal{L}}\sum_{e \in \mathcal{E}_s}\theta_\ell^{e,s}$$

$$g_{sub}(\lambda_s, \pi_{1,\ell}\pi_{2,\ell}, \pi_{3,\ell}, \xi_n^{e,s}, \theta_\ell^{e,s}) :=$$

$$\sum_{\ell \in \mathcal{L}}\frac{\pi_{1,\ell}\lambda_s}{\phi_\ell} + \sum_{\ell \in \mathcal{L}}\pi_{2,\ell}\lambda_s + \sum_{s \in S}\pi_{3,s}p_\ell^{e,s} - \xi_n^{e,s}\left(\sum_{\ell \in O_n} y_\ell^{e,s} - \sum_{\ell \in I_n} y_\ell^{e,s}\right)$$

In the above maximization problem (9), $\pi_{1,1}$, $\pi_{2,1}$, $\pi_{3,1}$, $\xi_n^{e,s}$, $\theta_{e,s}$ represent dual variables for a constraint condition of (8), (5b), (5c), (5d), and $y_l^{e,s} \leq 1$, respectively. The maximization problem (9) is a nonlinear optimization problem because there are a product of $\lambda_s$ and $\pi_{l,1}$ and a product of $\lambda_s$ and $\pi_{2,1}$. In the present embodiment, the maximization problem (9) is solved by a primal dual interior point method. In the following, an optimal solution of the maximization problem (9) is $\lambda_s^*(K)$, and an objective function value corresponding to the optimal solution is $Q(K)$. At this time, an upper bound of the optimal solution of the original problem (3) is defined as $\psi_{UB}(K)$, and the following formula is obtained.

[Math. 14]

$$\psi_{UB}(K) = \sum_{s \in S} \sum_{n \in N} \sum_{v \in V_s} c_n^{v,s} x_n^{*v,s}(K) + Q(K)$$

By alternately and repeatedly solving the above master problem (6) and sub-problem (9), it is ensured that the upper and lower bounds asymptotically converge to the optimal solution of the original problem (3).

<Hardware Configuration of Control Device 10>

Figure 2:
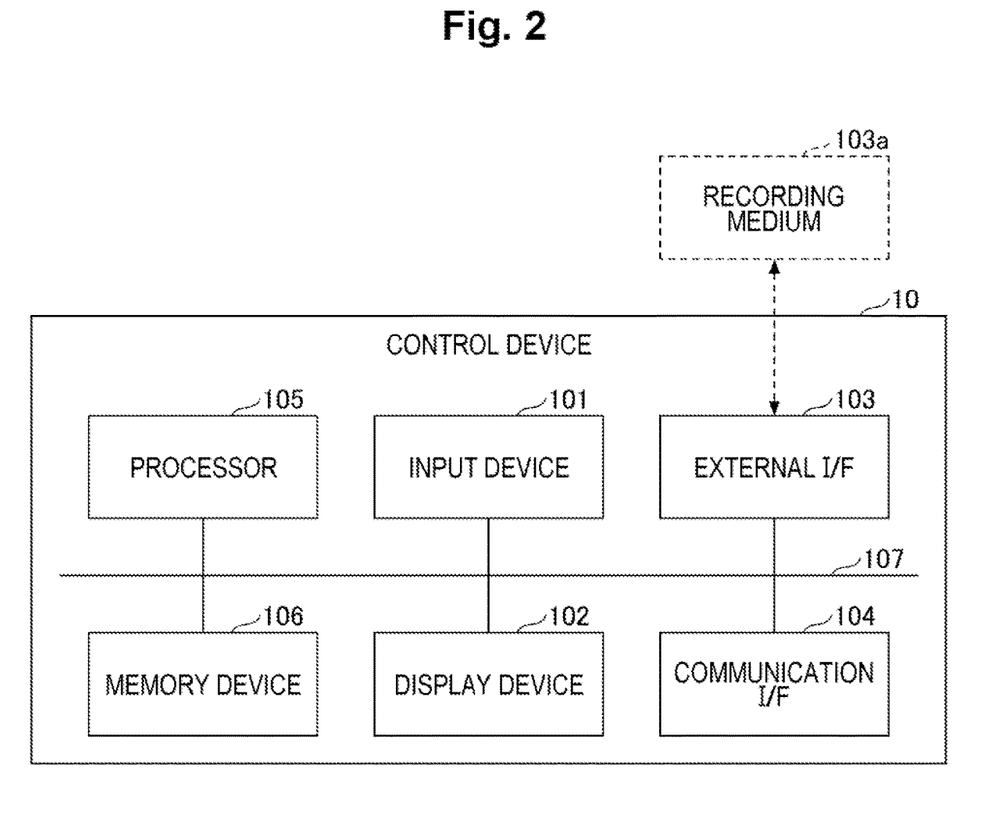
FIG. 2 is a diagram illustrating an example of a hardware configuration of a control device according to a present embodiment.

Next, a hardware configuration of the control device 10 according to the present embodiment will be described with reference to FIG. 2. FIG. 2 is a diagram illustrating an example of the hardware configuration of the control device 10 according to the present embodiment.

As illustrated in FIG. 2, the control device 10 according to the present embodiment is implemented by a hardware configuration of a general computer or computer system, and includes an input device 101, a display device 102, an external I/F 103, a communication I/F 104, a processor 105, and a memory device 106. These pieces of hardware are communicatively connected to each other via a bus 107.

The input device 101 is, for example, a keyboard, a mouse, or a touch panel. The display device 102 is, for example, a display. The control device 10 may not include, for example, at least one of the input device 101 or the display device 102.

The external I/F 103 is an interface with an external device such as a recording medium 103a. The control device 10 can read and write in the recording medium 103a via the external I/F 103. Note that examples of the recording medium 103a include a compact disc (CD), a digital versatile disk (DVD), a secure digital memory card (SD memory card), and a universal serial bus (USB) memory card.

The communication I/F 104 is an interface for connecting the control device 10 to a communication network. The processor 105 is, for example, any of various arithmetic devices such as a central processing unit (CPU) and a graphics processing unit (GPU). The memory device 106 is any of various storage devices such as a hard disk drive (HDD), a solid state drive (SSD), a random access memory (RAM), a read only memory (ROM), and a flash memory.

The control device 10 according to the present embodiment has the hardware configuration illustrated in FIG. 2, thereby being capable of implementing virtual network control processing to be described later. Note that the hardware configuration illustrated in FIG. 2 is an example, and the control device 10 may have another hardware configuration. For example, the control device 10 may include a plurality of the processors 105 or may include a plurality of the memory devices 106.

<Functional Configuration of Control Device 10>

Figure 3:
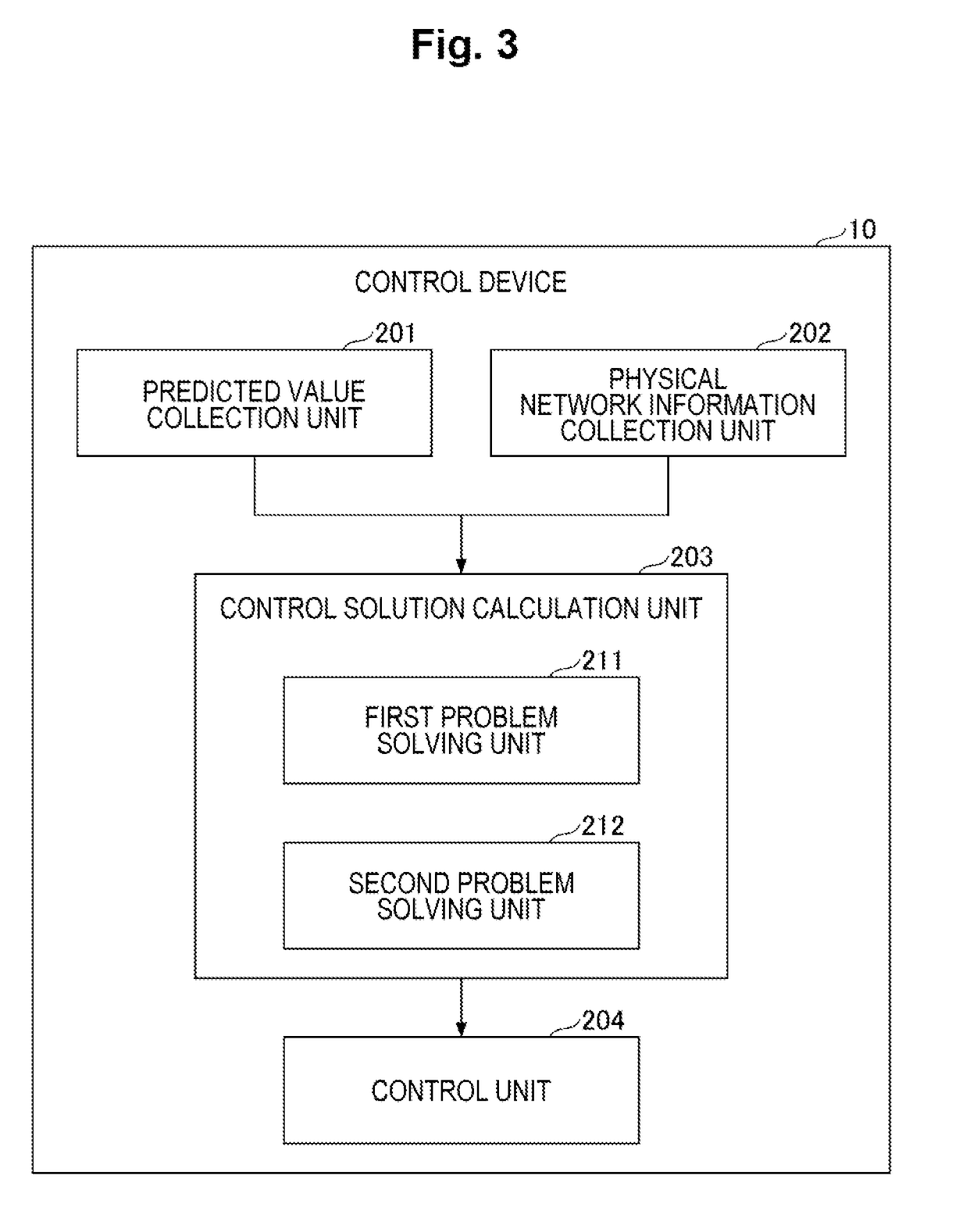
FIG. 3 is a diagram illustrating an example of a functional configuration of the control device according to the present embodiment.

Next, a functional configuration of the control device 10 according to the present embodiment will be described with reference to FIG. 3. FIG. 3 is a diagram illustrating an example of the functional configuration of the control device 10 according to the present embodiment.

As illustrated in FIG. 3, the control device 10 according to the present embodiment includes a predicted value collection unit 201, a physical network information collection unit 202, a control solution calculation unit 203, and a control unit 204. Each of these units is implemented by processing that one or more programs installed in the control device 10 cause the processor 105 to execute.

The predicted value collection unit 201 collects a predicted value of the amount of traffic of each service and a predicted value of the maximum available amount of power in each physical node. That is, the predicted value collection unit 201 acquires a nominal value and its deviation of the amount of traffic of each service and a nominal value and its deviation of the maximum available amount of power in each physical node.

In the present embodiment, it is assumed that the predicted value of the amount of traffic of each service and the predicted value of the maximum available amount of power in each physical node are obtained by a prediction algorithm using a time series model, or the like. For example, in a case where scheduling of VNF allocation and route determination in one day in a future is performed, the predicted value collection unit 201 acquires a predicted value of the amount of traffic and a predicted value of the maximum available amount of power up to one day ahead by some prediction algorithm. Here, it is assumed that these predicted values are an average value and a variance at a certain sampling interval. In this case, it is sufficient that the average value is set for the nominal value, and the variance is set for the deviation of the nominal value. Note that the sampling interval is, for example, a time interval set in advance depending on a control specification of VNF allocation or route determination, such as one minute or one hour.

Note that the nominal value and its deviation collected by the predicted value collection unit 201 are passed to the control solution calculation unit 203.

The physical network information collection unit 202 collects information regarding the topology of the physical network and various parameters (for example, the power consumption coefficient and the like).

Note that the information, various parameters, and the like collected by the physical network information collection unit 202 are passed to the control solution calculation unit 203.

The control solution calculation unit 203 uses the information collected by the predicted value collection unit 201 and the information collected by the physical network information collection unit 202 to execute an algorithm for solving the 2-stage robust optimization problems (3) and (5). That is, the control solution calculation unit 203 calculates the VNF allocation $x_n^{v,s}$ by alternately and repeatedly solving the master problem (6) and the sub-problem (9) in the first stage, and then calculates the route determination $y_l^{e,s}$ by solving the sub-problem (7) in the second stage. As a result, the VNF allocation $x_n^{v,s}$ and the route determination $y_l^{e,s}$ representing an optimal control solution of the original problems (3) and (5) are obtained.

Here, the control solution calculation unit 203 includes a first problem solving unit 211 and a second problem solving unit 212. The first problem solving unit 211 calculates a solution of the master problem (6) and calculates a lower bound of the optimal solution of the original problems (3) and (5). The second problem solving unit 212 calculates solutions of the sub-problem (9) and the sub-problem (7), and calculates an upper bound of the optimal solution of the original problems (3) and (5). Note that, for example, in a case where the above-described scheduling is performed, the control solution calculation unit 203 only needs to divide the 2-stage robust optimization problems (3) and (5) for each sampling time interval, and then execute the solving algorithm independently for each of the problems.

The control unit 204 controls the virtual network by the control solution calculated by the control solution calculation unit 203. As a result, the VNF allocation and the route determination represented by the optimal control solution are embedded in the physical network (That is, change is performed to optimal VNF allocation and route determination).

Note that, as an example, a case has been described where scheduling of VNF allocation and route determination in one day in a future is performed, but this is one of application examples, and the present invention is not limited thereto. For example, the present invention is similarly applicable to a case where the optimal VNF allocation and route are calculated in real time and the virtual network is dynamically controlled. Specifically, in a case where the predicted value of the amount of traffic of each service and the predicted value of the maximum available amount of power in each physical node can be collected for each sampling point, every time the predicted values are collected, the solving algorithm may be executed by the control solution calculation unit 203, and the VNF allocation and the route may be updated by the control unit 204.

<Virtual Network Control Processing>

Figure 4:
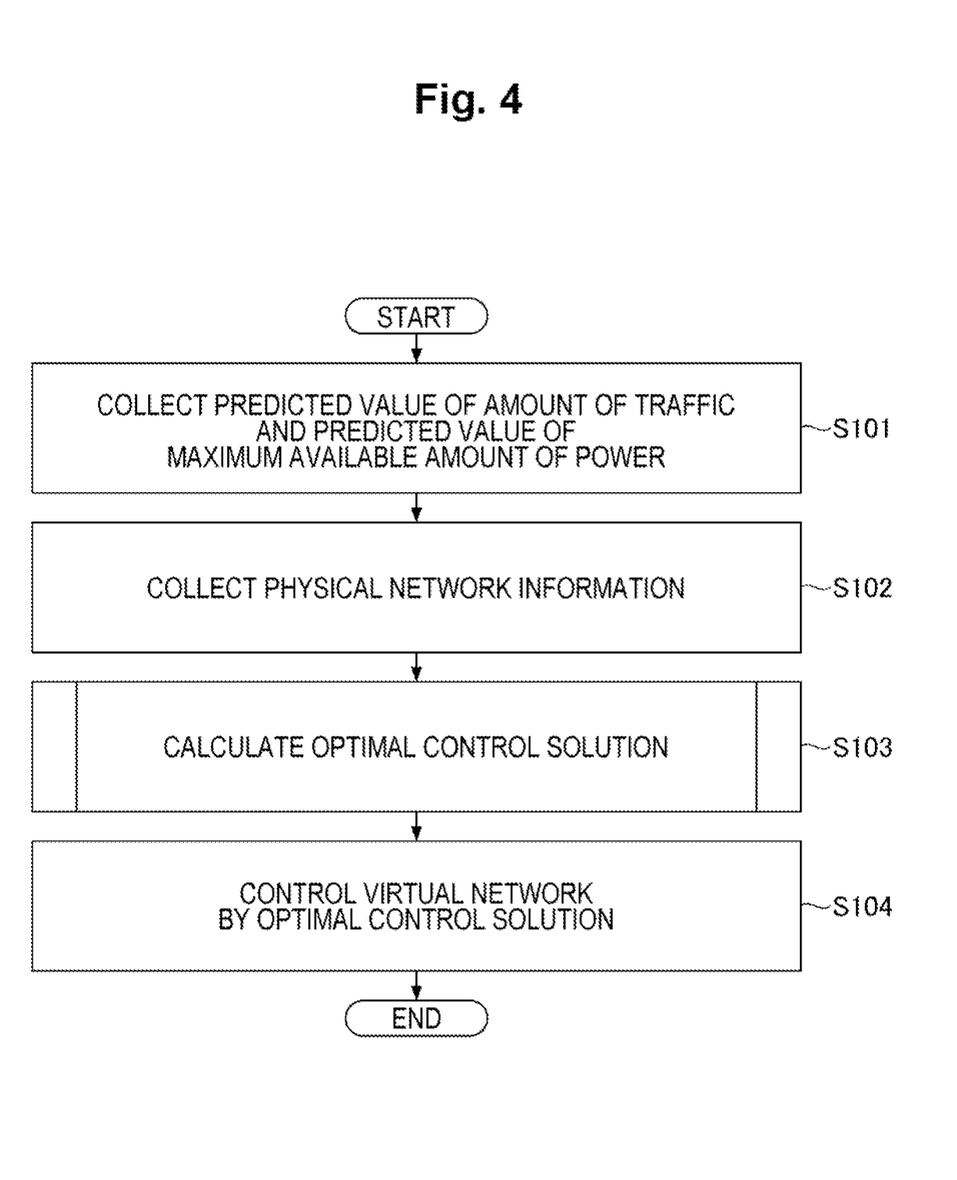
FIG. 4 is a flowchart illustrating an example of a flow of virtual network control processing according to the present embodiment.

Next, a flow of the virtual network control processing according to the present embodiment will be described with reference to FIG. 4. FIG. 4 is a flowchart illustrating an example of the flow of the virtual network control processing according to the present embodiment. Note that, it is assumed that the service $g(V_s, E_s)$ ($s=1, \ldots, N_s$) to be embedded is given to the control device 10 in advance.

First, the predicted value collection unit 201 collects a predicted value (nominal value and its deviation) of the amount of traffic of each service, and a predicted value (nominal value and its deviation) of the maximum available amount of power in each physical node (step S101).

Next, the physical network information collection unit 202 collects information regarding the topology of the physical network and various parameters (for example, the power consumption coefficient and the like) (step S102). However, in a case where the topology of the physical network and the values of the various parameters have not been changed since the last collection, this step may not be executed.

Subsequently, the control solution calculation unit 203 executes an algorithm for solving the 2-stage robust optimization problems (3) and (5) by using the information collected in steps S101 to S102 described above, and calculates an optimal control solution (step S103). Note that details of this step will be described later.

Then, the control unit 204 controls the virtual network by the control solution calculated in step S103 described above (step S104).

Figure 5:
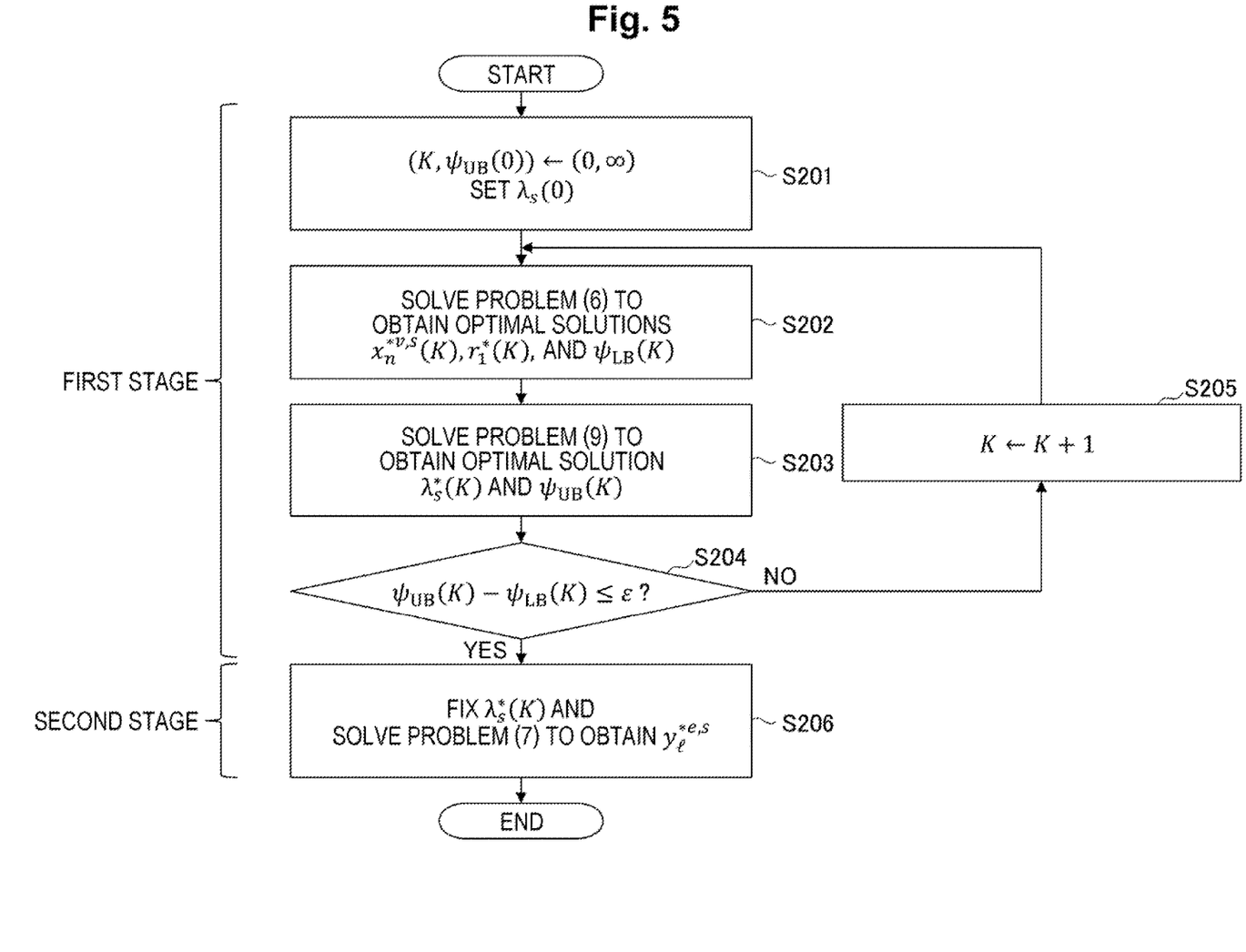
FIG. 5 is a flowchart illustrating an example of a flow of calculation processing for a control solution according to the present embodiment.

Here, details of calculation processing for the control solution in step S103 described above will be described with reference to FIG. 5. FIG. 5 is a flowchart illustrating an example of a flow of the calculation processing for the control solution according to the present embodiment.

First, the control solution calculation unit 203 sets step K=0 and $\psi_{UB}(0)=\infty$, and sets an initial value $\lambda_s(0)$ (step S201). Note that the initial value $\lambda_s(0)$ only needs to be set to any value belonging to $\lambda_s$. In addition, at this time, a parameter ε>0 for determining an end condition of the first stage may be set to a finite value.

Next, the control solution calculation unit 203 solves the master problem (6) by the first problem solving unit 211 to obtain optimal solutions $x_n^{*v, s}(K)$ and $r_l^*(K)$, and $\psi_{LB}(K)$ (step S202).

Next, the control solution calculation unit 203 solves the sub-problem (9) by the second problem solving unit 212 to obtain the optimal solution $\lambda_s^*(K)$ and $\psi_{UB}(K)$ (step S203). At this time, the control solution calculation unit 203 updates $\psi_{UB}(K)$ by $\psi_{UB}(K)=\min(\psi_B(K), \psi_{UB}(K-1))$.

Next, the control solution calculation unit 203 determines whether or not $\psi_{UB}(K)-\psi_{LB}(K)\leq\varepsilon$ is satisfied using a parameter ε set in advance (or the parameter ε set in step S201 described above) (step S204).

In a case where it is not determined in step S204 described above that $\psi_{UB}(K)-\psi_{LB}(K)\leq\varepsilon$ is satisfied, the control solution calculation unit 203 adds 1 to step K to update step K (step S205), and returns to step S202. As a result, steps S202 to S203 are repeatedly executed until $\psi_{UB}(K)-\psi_{LB}(K)\leq\varepsilon$ is satisfied.

On the other hand, in a case where it is determined in step S204 described above that $\psi_{UB}(K)-\psi_{LB}(K)\leq\varepsilon$ is satisfied, the control solution calculation unit 203 fixes $\lambda_s^*(K)$, and then solves the sub-problem (7) by the second problem solving unit 212 to obtain the optimal solution $y_l^{*e, s}$ (step S206).

As described above, the optimal solutions $x_n^{*v, s}(K)$ and $y_l^{*e, s}$ are obtained, and this is the optimal control solution (optimal solution) of the original problems (3) and (5). Note that, in step S206 described above, it is necessary to solve the sub-problem (7), but this optimization problem can be caused to come down to a simple linear programming problem related to $y_l^{e, s}$, and thus can be easily solved.

<Conclusion>

As described above, the control device 10 according to the present embodiment can perform VNF allocation and route determination to minimize the node power congestion rate and the link congestion rate robustly against the uncertainty of the amount of traffic and the uncertainty of the renewable energy by the virtual network control processing described above.

In the virtual network control processing described above, since the VNF allocation and the route determination are performed in consideration of the presence of uncertainty in the prediction regarding the amount of traffic and the amount of power of the renewable energy, it is possible to robustly prevent deterioration of communication performance and congestion that may occur due to influence of a prediction error, an increase in cost due to purchase for insufficient power, an increase in an environmental load due to a decrease in utilization rate of the renewable energy, and the like. Further, in addition to this, the node power congestion rate and the link congestion rate are minimized, so that it is possible to implement a virtual network having optimal durability against sudden changes in the amount of traffic and the amount of power of the renewable energy.

In addition, the virtual network control processing (particularly, calculation processing for the control solution) according to the present embodiment is a solving algorithm based on a theory of mathematical optimization called 2-stage robust optimization. In this theory, two-stage robust optimization based on a decision making process is performed, and it is known that a solution in which maintainability is reduced as compared with simple robust optimization can be obtained. This means that, even if there is an error in prediction of the amount of traffic and the renewable energy, it is possible to perform VNF allocation and route determination with low maintainability while suppressing occurrence of deterioration of communication performance or congestion and preventing occurrence of purchase cost for insufficient power and a decrease in utilization rate of the renewable energy.

The present invention is not limited to the above-mentioned specifically disclosed embodiment, and various modifications and changes, combinations with known technique, and the like can be made without departing from the scope of the claims.

REFERENCE SIGNS LIST

10 Control device
101 Input device
102 Display device
103 External I/F
103a Recording medium
104 Communication I/F
105 Processor
106 Memory device
107 Bus
201 Predicted value collection unit
202 Physical network information collection unit
203 Control solution calculation unit
204 Control unit
211 First problem solving unit
212 Second problem solving unit

The invention claimed is:

1. A control apparatus that allocates a virtual network on a physical network,
the control apparatus comprising:
a processor; and
a memory that includes instructions, which when executed, cause the processor to execute a method, said method including:
allocating virtual nodes constituting the virtual network to physical nodes and determining a route between the virtual nodes to minimize a link congestion rate representing a maximum value of a utilization rate of a physical link constituting the physical network and a node power congestion rate representing a maximum value of a power consumption rate of a physical node constituting the physical network on a basis of a predicted value of an amount of traffic of a service, a predicted value of an amount of power of each physical node, and information regarding the physical network.

2. A control method performed by a control apparatus that allocates a virtual network on a physical network, the control method comprising:
allocating virtual nodes constituting the virtual network to physical nodes and determining a route between the virtual nodes to minimize a link congestion rate representing a maximum value of a utilization rate of a physical link constituting the physical network and a node power congestion rate representing a maximum value of a power consumption rate of the physical node constituting the physical network on a basis of a predicted value of an amount of traffic of a service, a predicted value of an amount of power of each physical node, and information regarding the physical network.

3. The control apparatus according to claim 1, wherein the predicted value of an amount of traffic of a service comprises a nominal value of the traffic and a deviation from the nominal value that reflects uncertainty based on past traffic statistics or a time-series prediction model, and
the predicted value of an amount of power usable by each physical node comprises a nominal value of available power and a deviation from the nominal value that accounts for the variability of renewable energy supply.

4. The control apparatus according to claim 3, wherein the node power congestion rate is defined as a maximum value of a ratio of total power consumption of virtual network functions allocated to a physical node to a predicted maximum available amount of power of the physical node, and
allocation of the virtual nodes is determined to minimize this value under predicted power uncertainty.

* * * * *